Patented Apr. 1, 1924.

1,489,213

UNITED STATES PATENT OFFICE.

WILLY O. HERRMANN AND HANS DEUTSCH, OF MUNICH, GERMANY, ASSIGNORS TO CONSORTIUM FUR ELEKTROCHEMISCHE INDUSTRIE G. M. B. H., OF MUNICH, BAVARIA, GERMANY.

PROCESS OF IMPROVEMENT OF ALDEHYDE RESINS.

No Drawing.    Application filed August 3, 1922. Serial No. 579,527.

*To all whom it may concern:*

Be it known that we, WILLY O. HERRMANN and HANS DEUTSCH, citizens of Germany, residing at Munich, Germany, 20 Zielstattstrasse, have invented certain new and useful Improvements in Processes of Improvement of Aldehyde Resins, of which the following is a specification.

The products obtained by condensation respectively polymerization of aldehydes with condensing agents may as we have shown otherwise be employed in most cases like shellac, copal, amber and the like. They are soluble in the ordinary organic solvents but they are not soluble like shellac e. g. in watery solutions of borax and soda. It is the solubility in these watery solutions which is characteristic e. g. for shellac and which enables its employment in the manufacture of dressings and the like.

Our invention now consists in that we have discovered that it is possible to obtain from aldehyde-resins products having the characteristic solubility in watery solutions of borax and soda. This is attained by subjecting aldehyde-resins to an oxidizing treatment. A consequence of this oxidizing treatment is the bleaching and hardening of the resins.

The process may be carried out in different manners. Thus the aldehyde resins may be subjected to the oxidizing treatment in the molten state or dissolved or suspended in a solvent. The oxidizing process may be supported by catalyzers.

Example 1.

10 parts of aldehyde resin are dissolved in 100 parts of glacial acetic acid and ozonized oxygen is then led through this solution. This solution dark coloured at first becomes lighter. When the oxidizing process has reached the degree desired the dissolved resin is precipitated from the solution by adding water and separated out.

Example 2.

Into a solution of 20 parts of aldehyde resin in 100 parts of glacial acetic acid, and after adding 0.02 parts of acetate of manganese, oxygen is led for several hours whilst well stirring. The resin is then precipitated from the solution by adding water.

Example 3.

Into a suspension of 10 parts of aldehyde resin in 50 parts of water and after adding 0.01 parts of permanganate oxygen is led. The product obtained is separated from the water.

The products thus obtained may be employed directly but they may also be melted and brought in the form of pieces, plates, sheets or the like. The molten resin may also be rolled out in a rolling apparatus to shellac-like sheets.

These products may also be subjected to a hardening process by heating to higher temperatures or by any other means known for hardening resins e. g. by addition of glycerin or oxides of metals and the like.

The aldehyde-resin products which by the oxidizing treatment have become soluble in a watery solution of borax and soda like shellac may be employed in the manufacture of dressings, hat-stiffenings and the like. Besides this they may be used for other purposes like shellac, copal, amber and the like. They are also soluble in the solvents ordinarily used in the manufacture of varnishes, means for polishing and impregnating purposes.

We declare that what we claim is:

1. Process of improvement of aldehyde-resins which comprises subjecting aldehyde-resins to an oxidizing treatment.

2. Process of improvement of aldehyde-resins which comprises subjecting aldehyde-resins to an oxidizing treatment, the oxidizing agent being an ozone containing gas.

3. Process of improvement of aldehyde-resins which comprises subjecting aldehyde-resins to an oxidizing treatment in the presence of a catalyzer.

4. Process of improvement of aldehyde-resins which comprises subjecting aldehyde-resins to an oxidizing treatment, remelting the product obtained and hardening it hereafter by a hardening process.

5. Process of improvement of aldehyde-resins which comprises subjecting aldehyde-resins to an oxidizing treatment, remelting the product obtained and heating it at higher temperature.

6. Process of improvement of aldehyde-resins which comprises subjecting aldehyde-resins to an oxidizing treatment, remelting the product obtained and adding a hardening acting compound to the molten resin.

7. Process of improvement of aldehyde-resins which comprises subjecting aldehyde-resins to an oxidizing treatment, remelting the product obtained and adding an oxide of a metal to the molten resin.

In testimony whereof we affix our signatures in presence of two witnesses.

Dr. WILLY O. HERRMANN.
Dr. HANS DEUTSCH.

Witnesses:
 ALEXIS PHILIPPOFF,
 ALEXANDER DE SOTO.